(12) United States Patent
Kirbie (10) Patent No.: US 6,466,455 B2
(45) Date of Patent: Oct. 15, 2002

(54) UNIFIED POWER ARCHITECTURE WITH DYNAMIC RESET

(75) Inventor: Hugh Kirbie, Dublin, CA (US)

(73) Assignee: Seimens Medical Solutions USA, Inc., Iselin, NJ (US)

( * ) Notice: Subject to any disclaimer, the term of this patent is extended or adjusted under 35 U.S.C. 154(b) by 0 days.

(21) Appl. No.: 09/876,264

(22) Filed: Jun. 6, 2001

(65) Prior Publication Data

US 2002/0118558 A1 Aug. 29, 2002

(51) Int. Cl.[7] .............................................. H02M 3/335
(52) U.S. Cl. ............................ 363/16; 363/65; 363/71
(58) Field of Search ............................ 363/16, 65, 66, 363/67, 68, 69, 70, 71, 72, 131

(56) References Cited

U.S. PATENT DOCUMENTS

| | | | |
|---|---|---|---|
| 5,309,344 A | * | 5/1994 | Smith ........................ 363/65 X |
| 5,444,610 A | | 8/1995 | Gaudreau et al. ............. 363/54 |
| 5,905,646 A | | 5/1999 | Crewson et al. .......... 363/71 X |
| 5,930,125 A | | 7/1999 | Hitchcock et al. ............ 363/26 |
| 5,933,335 A | | 8/1999 | Hitchcock et al. ............ 363/25 |

OTHER PUBLICATIONS

"Solid–State Pulsed Power Systems", June 1998, 23d International Power Modulator Symposium, pp. 160–163.

* cited by examiner

*Primary Examiner*—Jessica Han (57) ABSTRACT

A unified power architecture for generating high frequency switched power to a load is provided which includes a number of input branches, each input branch receiving direct current (DC) power from a power source. Each input branch includes a switch device coupled to a storage device for generating input pulses, a transformer including a primary winding set receiving the input pulses, and a reset section generating a reset current for setting a core of the transformer. An output section is provided which includes a plurality of windings around a secondary of each transformer of each of the input branches, the output section generating an output pulse including components of each of the input pulses.

21 Claims, 6 Drawing Sheets

United States Patent 6,466,455 B2

UNIFIED POWER ARCHITECTURE WITH DYNAMIC RESET

CROSS-REFERENCE TO RELATED APPLICATIONS

This application is related to U.S. patent application Ser. No. 09/876,279, filed Jun. 6, 2001 for "UNIFIED POWER ARCHITECTURE," the entirety of which is incorporated by reference herein for all purposes.

FIELD OF THE INVENTION

The present invention relates to power supplies, and more particularly, to an improve d power supply for use in powering linear accelerators, and similar devices.

BACKGROUND OF THE INVENTION

Linear accelerators are used in a wide variety of applications. One important application is use in radiation therapy devices for the treatment of patients. In such an application, the linear accelerator is used to generate a high energy radiation beam for therapy. The high energy radiation beam is directed at a treatment zone (such as a cancerous tumor) on a patient to provide a selected dose of therapeutic radiation pursuant to a treatment plan prescribed by, e.g., an oncologist.

Typically, electron guns are used to generate electron beams supplied to the linear accelerator. A high energy beam is then created using a high frequency source (such as a magnetron or klystron) to supply radio frequency signals for the generation of an electromagnetic field. This electromagnetic field accelerates electrons in the accelerator, creating a high energy beam. The high energy beam can be an electron or photon (X-ray) beam.

An important component of these radiation therapy devices is the power system which drives the electron gun and the high frequency sources. Typically, a radiation therapy device may have one or more power systems, one to provide power to drive the electronic gun and one to provide high frequency power to drive either a magnetron, klystron, or other high frequency source. There is typically a different design for each power system, and often a different design is used for different high frequency sources. These power systems are used in an extremely unforgiving environment requiring high accuracy, reliability, maintainability and safety in a relatively small footprint all at a low cost of operation.

Highly accurate power supplies, delivering accurate pulsed power at a prescribed frequency are needed. Treatment therapies, typically prescribed for each patient by an oncologist, require accurate delivery of prescribed doses of therapeutic radiation. Accurate control of the power system driving the magnetron, klystron, and/or electron gun is essential to this accurate delivery of radiation.

The overall reliability of radiation therapy devices is an important concern to users of the devices and to patients. Typically, radiation therapy devices are very expensive units operated by hospitals and treatment centers (generically referred to herein simply as "hospitals") to treat life-threatening ailments such as cancer. Hospitals often can only afford one or two radiation therapy devices and therefore demand very high reliability in their operation. Because of their high cost, hospitals often run these devices at a brisk pace, scheduling treatments throughout every working hour of the week. Failure of the device is potentially devastating to both the hospital (in terms of revenue, scheduling, and patient care) as well as to patients who have a real and pressing need for uninterrupted treatment.

There is also a need for radiation therapy devices which are easily maintained. Electronic components do not last forever. Eventually, components require maintenance and/or replacement. When maintenance or replacement is required it is desirable to provide components which are easily and quickly maintained and installed by relatively unskilled workers.

The environment for these radiation therapy devices is made even more difficult due to space and power consumption constraints imposed by hospitals. Many hospitals can only install radiation therapy devices which occupy a relatively small amount of space. Other hospitals require several radiation therapy devices to satisfy the treatment needs of their patients, but can only install several devices if each of their footprints is small.

Existing power systems for linear accelerators in radiation therapy devices do not necessarily meet these needs for high accuracy, reliability, maintainability, and safety in a small footprint and at a low cost of operation. Many existing power systems for linear accelerators are large, heavy devices that significantly increase the cost and size of the radiation therapy system. One typical power system utilizes a high voltage transformer/rectifier system to generate a 21 kV DC power source from a conventional three-phase 208 V power source. The high voltage DC source is then used to generate a 15 kV pulse that is converted to the required 150 kV pulse via a high voltage pulse transformer. The high voltage transformer/rectifier assembly typically weighs 500 lbs. and occupies eight cubic feet As a result, the power supply must be housed in a separate cabinet from the linear accelerator. In addition to increasing the floor space needed to house the accelerator system, this additional cabinet requires special power transmission lines to couple the klystron output to the linear accelerator which further increases the cost and complexity of the system. Finally, the sheer weight of the system increases the cost of shipping.

Many existing power systems utilize a pulse forming network and a switch tube known as hydrogen thyratron. A thyratron is a low pressure gas device with a thermionic cathode. Over time, the cathode depletes itself. Thus, a thyratron has an inherent wear out mechanism. More recently, solid state power systems have been proposed. However, many of these systems utilize semiconductor controlled rectifiers (SCRs) to modulate the high voltage pulses needed to drive klystrons or magnetrons. Current SCRs tend to wear out relatively quickly under these conditions.

It would be advantageous to provide a method and apparatus that overcame the drawbacks of the prior art. In particular, it would be desirable to provide a solid state power architecture with greater reliability and maintainability which provides highly accurate pulsed power to a variety of different loads. Preferably, the power architecture achieves fast output pulse rise times in a modular architecture in a cost effective package taking up relatively little space.

SUMMARY OF THE INVENTION

To alleviate the problems inherent in the prior art, embodiments of the present invention provide a unified power architecture suitable for powering devices requiring high voltage pulsed power, such as klystrons, magnetrons, or the like.

In one embodiment of the present invention, a unified power architecture for generating high frequency switched power to a load is provided which includes a number of input branches, each input branch receiving direct current (DC) power from a power source. Each input branch includes a switch device coupled to a storage device for generating input pulses, a transformer including a primary winding receiving the input pulses, and a reset section generating a reset current for setting a core of the transformer. An output section is provided which includes a plurality of windings around a secondary of each transformer of each of the input branches, the output section generating an output pulse including components of each of the input pulses.

According to another embodiment of the present invention, the number of input branches is selected based on the requirements of the load to be driven. In one embodiment, two input branches are provided to drive a magnetron, while five input branches are provided to drive a klystron. In one embodiment, portions of each input branch is formed on a separate printed circuit board (PCB). In one embodiment, each input branch is interchangeable. The result is a unified power supply which is highly reliable, easily maintained, modular, accurate, all with a low cost of operation in a small footprint.

In one embodiment, the switch of each input branch is performed using an Insulated Gate Bipolar Transistor (IGBT) operatively controlled by a control device. In one embodiment, an IGBT is used to selectively provide the reset current to the transformer core in each input branch. In one embodiment, the reset IGBT is also operatively controlled by a control device, allowing input pulses and reset pulses to be synchronized, resulting in an output pulse with a fast rise time and good overall quality.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF THE INVENTION

Figure 1:
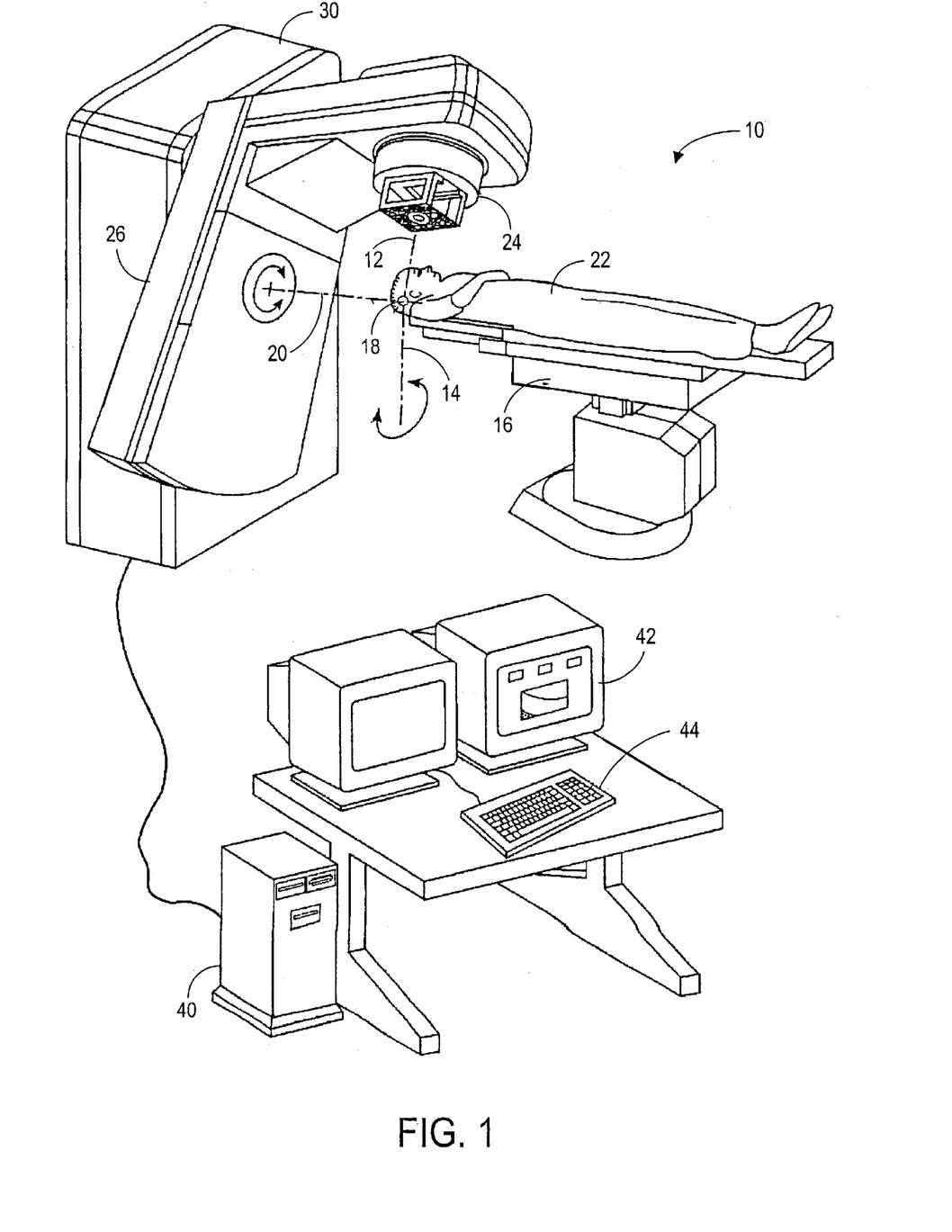
FIG. 1 is a diagram of a radiation treatment device and treatment console in which the power architecture of the present invention may be used.

Turning now to the drawings and referring first to FIG. 1, a radiation therapy device 10 of a type which may incorporate features of the present invention is depicted. Radiation therapy device 10 is configured to deliver a therapeutic beam 12 of radiation from a treatment head 24 toward a treatment zone 18 on a patient 22. Patient 22 typically is stationed on a treatment table 16 which is positioned to comfortably orient patient so that treatment zone 18 is positioned in the path of beam 12. Treatment head 24 is typically located on a gantry 26 which is rotatable about an axis 20 to accurately direct beam 12 toward treatment zone 18. Electron, photon or any other detectable radiation can be used for the therapy.

A linear accelerator (shown as item 100 in FIG. 2) is located in gantry 26 to generate the high power radiation required for the therapy. A control system (not shown), used to control and drive the linear accelerator and other components of radiation therapy device 10, is located in a housing 30. This control unit may include, for example a power system such as the unified power system of the present invention.

Radiation therapy device 10 also includes a central treatment control unit 40 which is typically located apart from housing 30, gantry 26, and patient 22 to protect an operator of control unit 40 (such as a radiation therapist) from radiation. Central treatment control unit 40 includes output devices such as at least one visual display unit or monitor 42 and an input device such as a keyboard 44. Data can be input also through data carriers such as a data storage devices or a verification and recording or automatic setup system.

Central treatment control unit 40 is typically operated by the therapist who administers actual delivery of radiation treatment as prescribed by an oncologist by using the keyboard 44 or other input device. The therapist enters data into control unit 40 that defines the radiation dose to be delivered to the patient, for example, according to the prescription of the oncologist. The treatment data can also be input via another input device, such as a data storage device. Various data can be displayed before and during the treatment on the screen of the monitor 42.

As described above, radiation therapy device 10 must operate in a difficult environment requiring high accuracy, reliability, maintainability and safety in a relatively small footprint at a low cost of operation. Applicants have discovered an improved, unified power system which satisfies these requirements.

Figure 2:
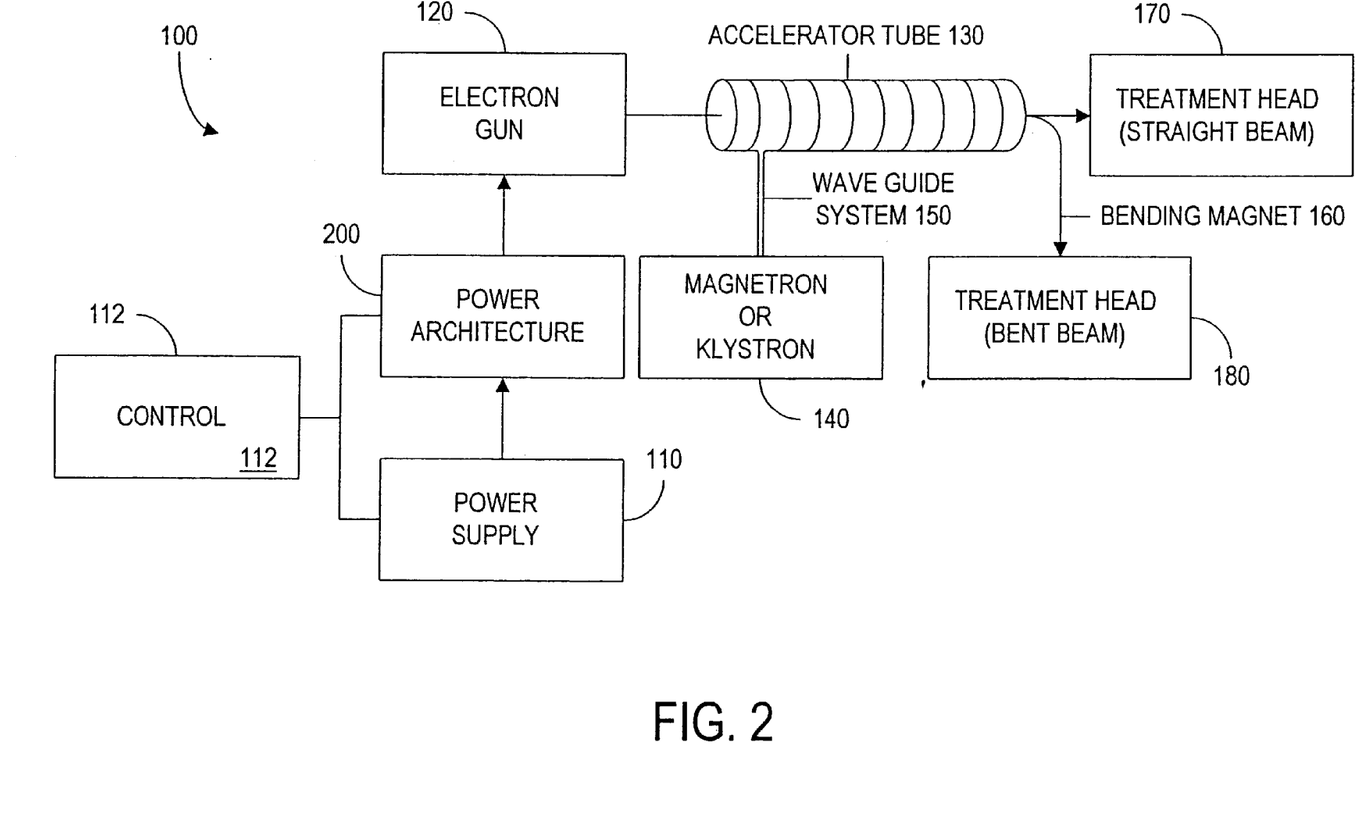
FIG. 2 is a block diagram of a linear accelerator which may be used in the radiation treatment device of FIG. 1 according to an embodiment of the present invention.

Features of embodiments of the present invention will now be described by referring to FIG. 2, where a linear accelerator 100 is shown which may be used in radiation therapy device 10 (FIG. 1). Linear accelerator 100 includes a control unit 112 which is used to control the operation of a power supply 110 and the operation of a power architecture 200. Power supply 110 provides D.C. power to power architecture 200. According to embodiments of the invention, power architecture 200 is a highly reliable, solid state source which generates high voltage, flat-topped D.C. pulses of a few microseconds in duration which are used to power a load such as a magnetron or klystron 140.

Power architecture 200 may also be used to generate lower voltage pulses to power an electron gun 110. In operation, pulsed microwaves produced in magnetron or klystron 140 are injected into an accelerator tube 130 via a waveguide system 150. At the proper instant, electrons, which are produced by electron gun 120, are also pulse injected into accelerator tube 130. High energy electrons emerge from accelerator tube 130 in the form of a beam of approximately 3 mm in diameter. These electrons can be fed to treatment head 170 as a straight beam or to a treatment head 180 as a bent beam. If the electrons are sent to treatment head 180, the electrons are bent by, for example, a bending magnet 160 through a suitable angle (e.g., 270 degrees) between accelerator tube 130 and the target. During treatment, this radiation beam is trained on a treatment zone of patient 22 lying in the isocenter of gantry 26 of radiation therapy device 10 (FIG. 1).

Applicants have developed a unified power architecture that overcomes many of the disadvantages of prior art systems. Embodiments of the present invention may be understood by now referring to FIG. 3, where a block diagram of a power architecture 200 according to one embodiment of the present invention is shown. According to one embodiment, power architecture 200 is driven by a power supply 110 which produces D.C. power. In one embodiment, power supply 110 is a switched power supply such as a 208 Volt, three phase supply which produces 0–3 kV positive D.C. power at 0–7 Amperes. Power supply 110 supplies D.C. power to power architecture 200 which generates high frequency, flat topped, output pulses to drive a load 300. According to one embodiment of the invention, power architecture 200 is a modular design which may generate power for different loads, including, for example a magnetron or klystron. A similar configuration of unified power architecture 200 may be used to generate power for loads requiring lower voltage, such as, for example, electron gun 120.

Figure 3:
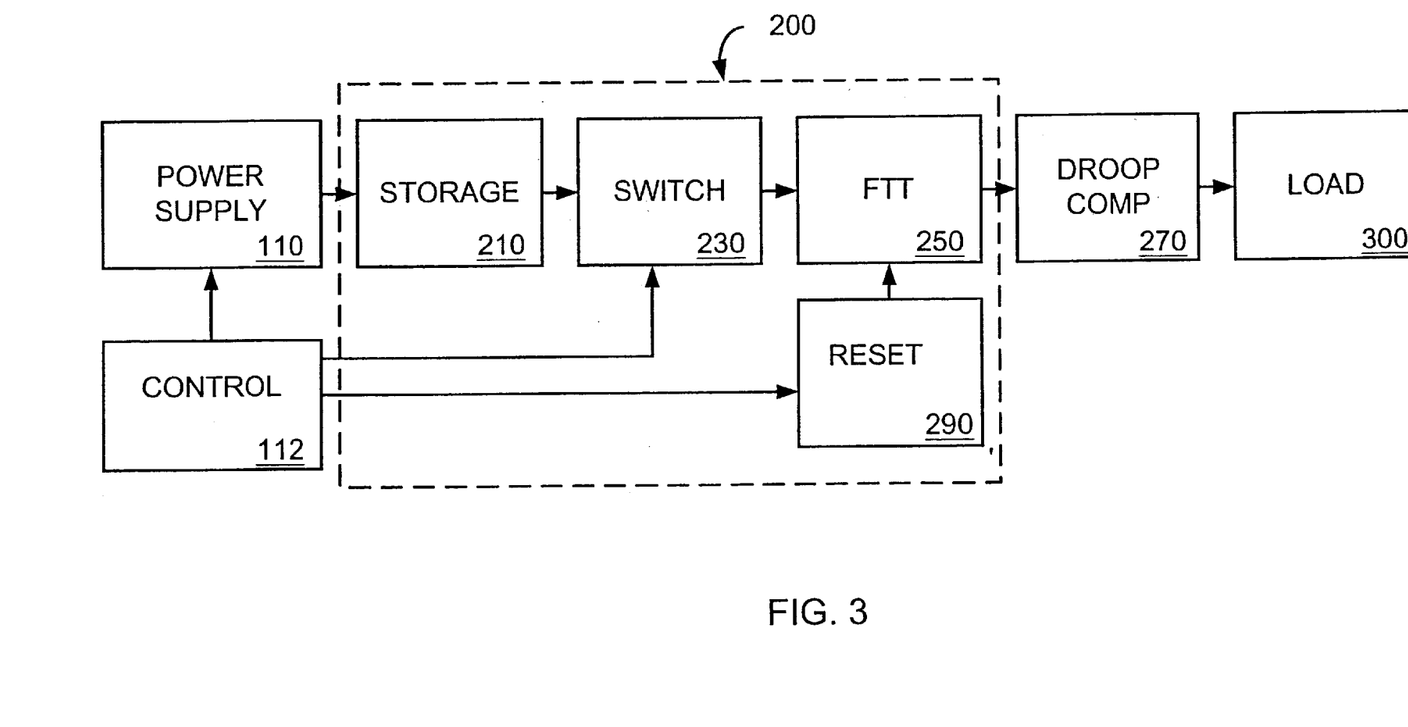
FIG. 3 is a block diagram of the power architecture according to an embodiment of the present invention.

In one embodiment, the operation of power supply 110 is controlled by control unit 112, although in some configurations, some features of power supply 110 may be manually controlled by an operator (not shown). Control unit 112 also controls operation of power architecture 200 to generate output pulses of a desired frequency and magnitude to drive load 300 in a manner which delivers an appropriate dose of therapeutic radiation in a radiation therapy device 10 (FIG. 1).

In one embodiment, power architecture 200 includes a storage section 210 which is charged by power supply 110 through fractional-turn transformer section 250. When a pulse is needed, control unit 112 selectively operates switch section 230 for a period to produce a high frequency output pulse which is stepped up to a high voltage, high frequency output pulse by fractional-turn transformer section 250. The output of fractional-turn transformer section 250, in one embodiment, is passed through a droop compensation circuit 270 to ensure that the output pulses are of a high quality, having a substantially flat pulse top. These high quality, flat topped pulses are used to drive load 300.

In one embodiment, a reset section 290 is controlled by control 112 to selectively deliver a reset current to reset the magnetic core of fractional-turn transformer section 250, allowing fractional-turn transformer section 250 to operate at higher frequencies, with improved rise times as will be discussed further below in conjunction with FIG. 5.

According to one embodiment of the present invention, storage section 210, switch section 230, and reset section 290 are modular and are formed on printed circuit boards (PCB). A number of different sections 210, 230, 290, each on a PCB, may be provided based on power needs of load 300. Maintenance is simplified and expedited as a defective section may be fixed by simply replacing one or more individual PCBs. According to one embodiment of the invention, each PCB (which contains one "branch" or "section" of power architecture 200 as will be discussed further below), may be formed with identical components. Manufacturing, maintenance, stocking, and installation is thus simplified by requiring that only a single configuration of PCB be produced for a given design.

According to a further embodiment of the present invention, each branch, including fractional-turn transformer section 250, is formed on a single PCB, further facilitating maintenance and supply. Applicant has found that lower power systems are suited for this embodiment. For example, the power architecture for use with an electron gun such as the electron gun 120 of FIG. 2, may be implemented using features of the present invention where each branch, including section 250, may be formed on an individual PCB. Those skilled in the art, upon reading this disclosure, will realize that other types of loads may also lend themselves to such use.

Further, as will be described in more detail below, the output of power architecture 200 may be increased or decreased by simply adding or removing PCBs. The output of power architecture 200 may also be adjusted by applying different control signals from control 112 to each branch of power architecture 200. For example, in one embodiment, each branch may be controlled to generate an output pulse at a slightly different time, causing the overall output pulse of the power architecture 200 to rise at a different rate (e.g., an electronic dV/dt adjustment). The result is a highly-reliable, easily maintainable and modular power system which increases the reliability and accuracy of radiation therapy devices while reducing the cost of operation and ownership. Because the design is a solid state design, the size of the system is relatively compact. Further still, as will be discussed further below, the system does not require dangerous high voltage and high current inputs, reducing the cost and complexity of other components, including power supply 110.

Figure 4:
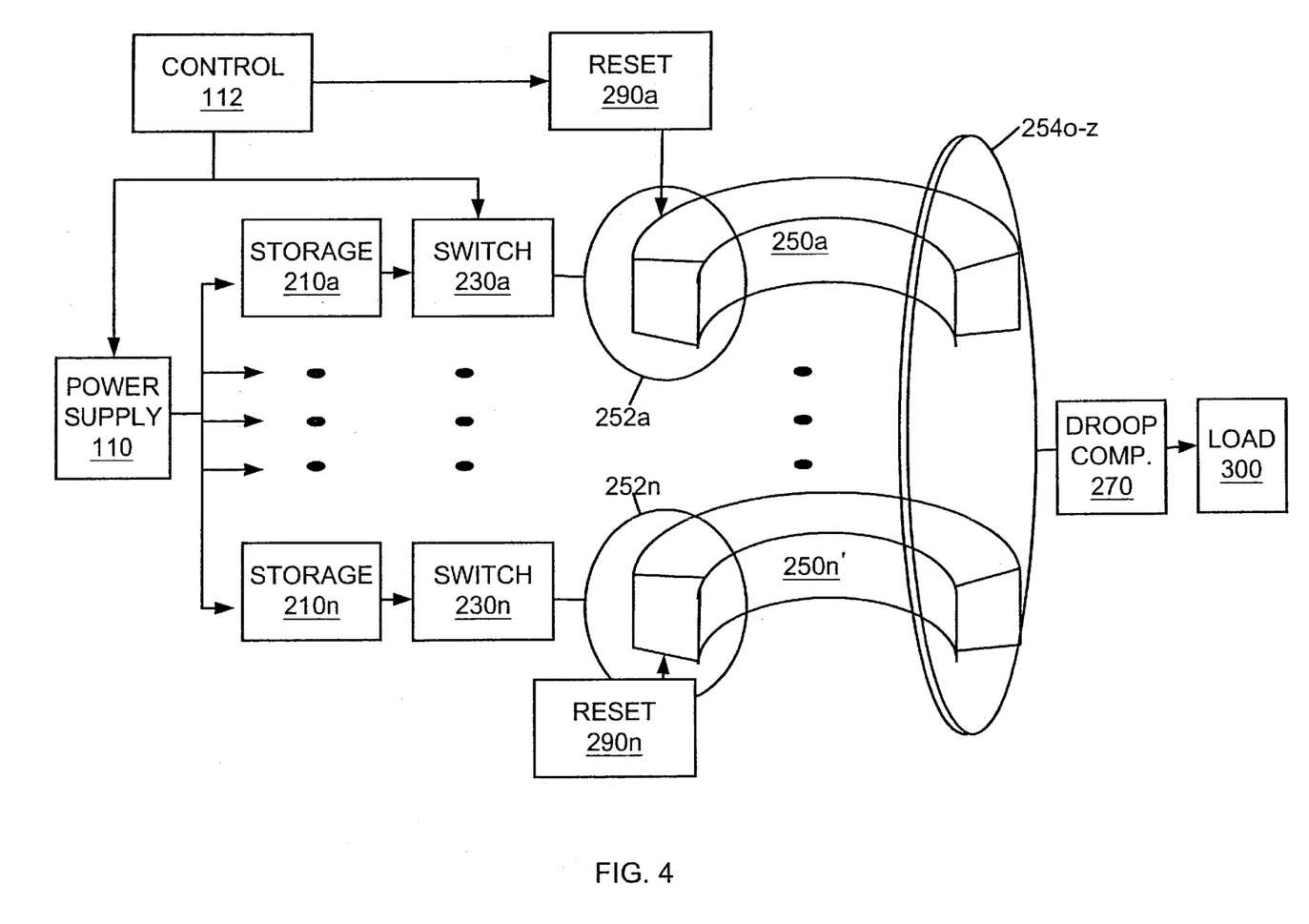
FIG. 4 is a further block diagram of the power architecture according to an embodiment of the present invention.

Further details of power architecture 200 will now be described by referring to FIG. 4. As can be seen more clearly in FIG. 4, power architecture 200 includes a number of branches (each branch including components designated by the lower-case letters *a–n*). Each branch may be formed on a single PCB. In one embodiment of the present invention, each branch includes storage 210, a switch 230, a reset circuit 290, a transformer core 250, and one or more primary winding set(s) 252. Power supply 110 provides power to each of the branches of power architecture 200, charging storage devices 210*a–n*. High frequency pulses are generated by selectively operating switches 230*a–n* resulting in pulsed power being provided to each of the primary winding sets 252*a–n* of transformer cores 250*a–n*. Further details of one currently-preferred embodiment of storage 210 and switch 230 will be described further below in conjunction with a discussion of FIG. 5.

In a currently-preferred embodiment, the transformer cores 250 have a commonly-wound secondary to cause the transformer to operate as a fractional-turn transformer. The windings 254*o–z* of the secondary winding set generate an output pulse with a voltage approximately equal to the sum of the input voltages at the primary winding sets. In an embodiment designed to provide power to a klystron, five (5) transformer cores 250 are used, each having three (3) primary winding sets and a commonly-wound secondary set having fifty (50) windings 254. In an embodiment designed to provide power to a magnetron, two (2) transformer cores 250 are used, each having three (3) primary winding sets and a commonly-wound secondary set having fifty-four (54) windings 254.

The pulse output from the secondary is a high voltage, low current output pulse formed from a low voltage D.C. power input from power supply 110. The selection of materials and structure of transformer cores 250 and winding sets 252, 254 depend on the application, input characteristics and output characteristics and are known to those skilled in the art. In one embodiment, transformer cores 250 are formed of a material such as a magnetic alloy which has high saturation induction, low core loss, and high B-H squareness. According to one embodiment of the present invention, reset circuit 290*a–n* is provided to deliver a reset current to reset the magnetic material of each transformer core.

According to one embodiment of the present invention, the output pulse from windings 254*o–z* of the secondary winding set is sent through a droop compensation circuit 270 to ensure that the output pulse shape is of good quality (i.e., a relatively flat pulse top) to drive load 300. High frequency sources such as klystrons and magnetrons require input pulses of relatively good quality, particularly where the high frequency sources are used in medical radiation therapy environments.

According to one embodiment of the invention, a single droop compensation circuit is provided at the output of the power architecture. Applicants have discovered that such a configuration provides an improved quality output pulse as compared to systems which provide droop compensation on pulses input to the primary side of the transformer. Further, according to one embodiment of the invention, space on individual PCBs is conserved and power dissipation is reduced by not utilizing droop compensation circuits on the primary side of the transformer. The result is a system which provides an improved quality high frequency pulse to drive a variety of loads.

According to one embodiment of the present invention, the number of branches, the number of transformer cores 250, and the number of secondary windings 254 are based on requirements of load 300. For example, in one embodiment, each branch is designed to produce approximately four (4) MW of peak output power per branch. Portions of each branch may be produced on a separate PCB. Therefore, as an example, to configure unified power architecture to drive a klystron (such as a klystron requiring peak power of approximately 19.2 MW), five (5) branches, transformer cores 250 (e.g., 250*a*, 250*b*, 250*c*, 250*d*, and 250*e*) with commonly-wound secondaries are used to produce an output pulse of 160 kV at 120 Amperes with a pulse width of between 5 to 8 $\mu$Seconds at a cycle rate of between 100 and 400 Hertz (e.g., average power of approximately 20 kW).

In this example, the unified power architecture may be configured to drive a different load such as a magnetron, by providing a different number of branches. For example, where the load to be driven is a magnetron (such as a magnetron requiring peak power of approximately 6 MW), two (2) branches and transformer cores 250 (e.g., 250*a* and 250*b*) are used to produce an output pulse of 50 kV at 110 Amperes with a pulse width of between 5 to 8 $\mu$Seconds at a cycle rate of between 100 and 400 Hertz (e.g., an average power of approximately 6–8 kW). Upon reading this disclosure, those skilled in the art will now recognize that features of embodiments of the present invention may be used to develop a modular power supply for any of a number of different loads. According to one embodiment of the present invention, different loads can be accommodated by simply adding or removing PCBs having individual branches of the invention.

Figure 5:
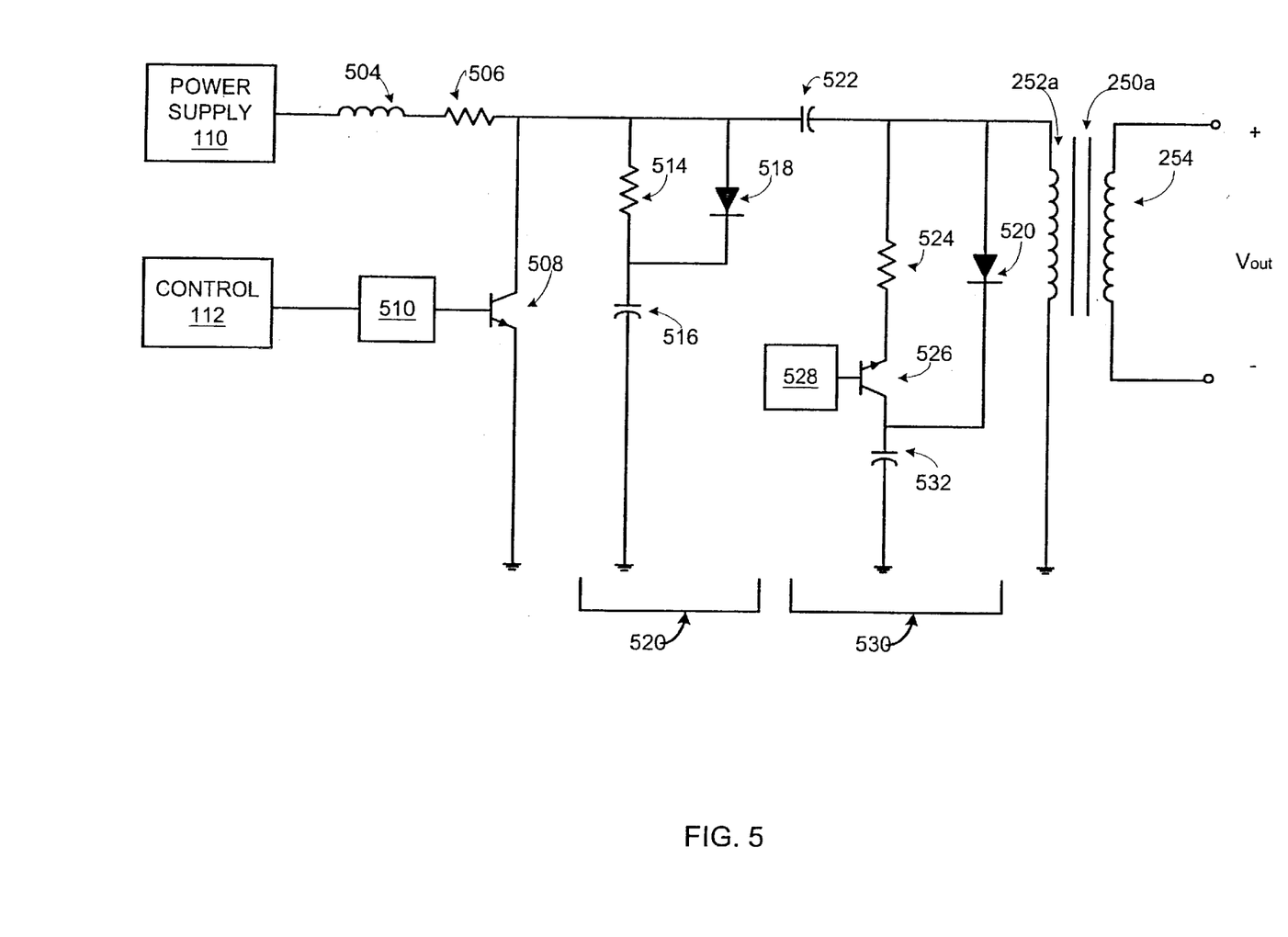
FIG. 5 is a schematic diagram of a portion of the power architecture according to an embodiment of the present invention.

Referring now to FIG. 5 a schematic diagram is shown which depicts a portion of power architecture 200 according to an embodiment of the present invention. In particular, FIG. 5 depicts one branch of power architecture 200 of FIG. 4. According to one embodiment of the present invention, each branch of power architecture 200 is similarly configured and may be formed on a separate PCB.

Each branch is coupled to receive input power from power supply 110. An input circuit including an inductor 504 and resistor 506 may be used to isolate each branch from power supply 110 as is known to those skilled in the art. In one example embodiment, where power supply 110 is a switched 208 Volt, three phase supply producing approximately 1850 kV positive D.C. power at 0–11 Amperes, inductor 504 is a 600 $\mu$H inductor and resistor 506 is a 5 ohm resistor. Those skilled in the art will recognize that these values are presented to illustrate an embodiment of the invention, and that other components and values may be selected as needed to isolate each branch from power supply 110.

Operation of power supply 110 is controlled by control 112, which also controls the operation of an Insulated Gate Bipolar Transistor (IGBT) 508 by applying a control signal to a control pad 510 of IGBT 508. IGBT 508 is switched on or off based on a voltage applied to a gate of IGBT through control pad 510. Power supply 110 is operated to charge capacitor 522 through primary winding set 252*a*. Pulses are generated by selectively switching IGBT 508 on and off (i.e., placed in a conducting or non-conducting state) to couple capacitor 522 to primary winding set 252*a*. A pulse may be generated by operating control 112 to command the gate drive circuit 510 to switch IGBT 508 to a conducting state. IGBT 508 then connects the charged capacitor 522 to primary windings 252*a*, producing a high voltage output pulse at the secondary. When the desired pulse width is reached, control 112 causes gate drive circuit 510 to place IGBT 508 in a non-conducting state to end the pulse. In the terminology of FIG. 3, IGBT 508 operates as the switch 230, and capacitor 522 operates as the storage 210. Embodiments of the present invention allow the production of an output pulse which has a pulse width that is continuously variable. The pulse width may be controlled by control 112. This provides great variability and precision in treatment control for radiation therapy devices which are driven using power architecture 200. Further, because the variable pulse width is generated using IGBT switching action, pulse forming networks are not needed, and the impendence matching problems associated with those pulse forming networks are eliminated.

In one embodiment, control 112 is operated to cause IGBT 508 to switch every 4 to 7.5 msec causing a high frequency output pulse to be generated at primary winding set 252*a*. The frequency at which IGBT 508 is operated is selected based on the treatment plan established for radiation therapy device 10 (FIG. 1) (e.g., a treatment plan calling for a very high frequency dose to be delivered to a patient may require that IGBT 508 be switched at a higher frequency). Applicants have found that IGBTs produced by the European Power-Semiconductor and Electronics Co. (EUPEC) of Warstein Del. (such as their IGBT model FZ 1200 R33 KF2) are suitable for use in embodiments of the invention, although other manufacturers and models may also be suitable so long as the IGBT has suitably high turn on and turn off times (e.g., approximately 100–300 $\eta$sec).

Capacitor 522 is a large storage capacitor, in one embodiment a 100 $\mu$F capacitor capable of producing a charge of approximately 2000V. Those skilled in the art will appreciate that rather than using a single capacitor, a bank of more than one capacitor may be provided to achieve the functionality of capacitor 522. Preferably, capacitor 522 is selected to deliver high current surges at a high repetition frequency.

Further, capacitor 522 is preferably selected to provide a long service life. Embodiments of the present invention provide a greater service life by allowing capacitor 522 to remain charged after each pulse. Further, embodiments of the present invention allow use of lower charge voltages by spreading the pulsed voltage value among several (e.g., five for a klystron load) branches of the power architecture 200. This allows the use of lower voltage components (such as IGBT 508 and power supply 110) and may avoid the need to immerse the entire power supply 110 and switching electronics in oil (ensuring easier and cheaper maintenance).

In some embodiments of the present invention, a snubber circuit 520 is provided to dissipate excess current which results when IGBT 508 is operated at the end of a pulse. At this time, current flowing toward IGBT 508 is diverted to snubber circuit 520. Current flowing toward capacitor 522 is diverted to a reset circuit 530 (which will be discussed in detail below). Both snubber circuit 520 and reset circuit 530 are designed to allow the currents to return to zero without generating excessive voltage on the IGBT.

In one embodiment, snubber circuit 520 consists of a resistor 514 coupled to a capacitor 516, both in parallel with a diode 518. Each of these components is selected to avoid placing IGBT 508 in an overvoltage condition by controlling the rate of current discharge which occurs when IGBT 508 is opened. In one embodiment, a relatively large current (up to approximately 2000 A) attempts to discharge across IGBT 508 when the IGBT 508 is opened. Components of snubber 520 are selected to provide a discharge path for this current. In one embodiment, resistor 514 is a 25 ohm resistor (a value selected based on the desired rate of discharge), capacitor 516 is a 0.3 $\mu$F capacitor, and diode 518 is a 3500V, 120 A assembly.

In one currently-preferred embodiment, a separate snubber circuit 520 is not necessary for the operation of power architecture 200, thereby reducing the cost and power dissipation associated with each PCB. Instead, IGBT 508 is selected which has a control feature that can be set to operate safely in short circuit conditions, thereby allowing a discharge path to ground across the IGBT. Gate control 510 may be selected and operated to detect and limit the maximum amount of collector current, thereby managing short circuit conditions. Gate control 510 preferably also is selected and operated to turn off "normal" pulses to eliminate the need for snubber 520. This is accomplished by controlling the speed at which IGBT current is terminated at the end of each pulse during normal operation. Preferably, the speed at which IGBT current is terminated is selected to be sufficiently slow to reduce IGBT voltage. IGBT 508 is further protected due to the low inductance interconnections provided by the PCB and the normal operation of the reset circuit 530. Other techniques for discharging current built up as IGBT 508 switches off may also be used.

In one embodiment, a reset circuit 530 is also provided. Reset circuit 530 performs several functions, one of which is to set the core of transformer 250. Those skilled in the art appreciate that, particularly to achieve high frequency operation, magnetic materials used as transformer cores often require the application of a reverse voltage. Many systems provide a small, separate power supply to perform this reset function. According to one embodiment of the present invention, reset circuit 530 is used, reducing the overall cost of the power architecture 200 while achieving high performance in high frequency conditions.

According to the invention, reset circuit 530, as will be discussed further below, also provides some protection to the system in the event that IGBT 508 fails to function properly. Further, reset circuit 530 may also be used to assist in the production of a clean, well-formed pulse as an output. Each of these features of reset circuit 530 help to ensure that power architecture 200 performs efficiently and reliably in high frequency conditions.

Reset circuit 530 includes, in one embodiment, a resistor 524 coupled with IGBT 526. IGBT 526 is coupled to a reset capacitor 522. A diode 530 is coupled to provide a path to reset capacitor 532. A control pad 528 coupled to a gate of IGBT 526 is operated to switch IGBT 526 to control the generation of charging current from reset capacitor 532. In one embodiment, control pad 528 of IGBT 526 is coupled to control 112 to synchronize the release of charging current after discharge of current from capacitor 522.

Operation of IGBT 526 may be controlled by control 112 to progress as follows. During the time period that IGBT 508 is operated to generate an output pulse, reset circuit 530 is inactive. At the end of the pulse (IGBT 508 is caused to open by control 112), diode 520 and reset capacitor 532 provide a pathway for current flowing in the transformer 250. This results in a voltage in reset capacitor 532 that may reach (in one embodiment) approximately 100V after several pulses. During the time between pulses (in one embodiment, more than approximately 2000 $\mu$sec), IGBT 526 in reset circuit 530 is switched by control 112 to connect the charged reset capacitor 532 to primary winding set 252a. The resulting current is directed in a way that "resets" or re-magnetizes core 250a to a state that is favorable for the next pulse. By controlling the reset pulse width (via control 112 operating gate control 528), the voltage across IGBT 532 is regulated to a constant value. Resistor 524 operates to limit the value of reset current flowing between reset capacitor 532 and primary winding set 252a.

In one embodiment, resistor 524 is a 10 ohm resistor, and reset capacitor 532 is a 100 $\mu$F capacitor selected to provide a small charging current to reset transformer core 250a. Applicants have discovered that use of reset circuit 530 provides a number of useful advantages in the operation of power architecture 200. For example, reset circuit 530 captures and stores the magnetic energy remaining in the transformer core after each pulse. The energy is stored in capacitor 532 and released back to the system between pulses in a way that: (a) controls the backswing voltage on the load; (b) resets the magnetic core for the next pulse; and (c) shapes the fall time of the main output pulse.

Those skilled in the art will appreciate that selection of particular components of reset circuit 530 will depend upon the maximum and minimum operating frequencies as well as the size of the charging current required to reset the transformer core.

Operation of power supply 110, storage capacitor 522 and IGBT 508 results in the generation of a high frequency pulse presented to primary winding set 252a. A higher voltage, stepped-up output voltage (Vout) is produced at secondary winding set 254. Because more than one branch is operated in parallel (e.g., as shown in FIG. 4), with a commonly wound secondary (i.e., operating as a fractional-turn transformer), Vout includes components from each of the branches. Control 112 ensures that IGBTs 508, 526 are switched, and charging currents for each of the branches are applied at the same time and at the same frequency, ensuring that Vout is a high voltage output pulse of a desired frequency.

Embodiments of the present invention provide features which help to ensure that failure of a branch (e.g., as a result of failure of IGBT 508) does not cause the entire power architecture 200 to fail. In one embodiment, reset circuit 530 functions to assist in an open circuit failure of IGBT 508. Without features of the present invention, an open circuit failure would result in the failed branch denying the other branches a convenient current pathway. According to embodiments of the invention, this failure is prevented. For example, if IGBT 508 of a branch of power architecture 200 fails as an open circuit, reset circuit 530 will continue to provide some current (via reset capacitor 532) to primary winding set 252, allowing the other branches of the power architecture 200 to pass their primary currents through the fractional turn transformer. If IGBT 508 fails as a short circuit, the system will continue to function with the other branches using the failed IGBT to carry their current.

The resulting output voltage (Vout) in such a condition will be reduced by an amount equal to the percentage contribution otherwise provided by the failed branch (e.g., if five input branches are typically used to drive a klystron, and one of the branches fails, the output pulse will be reduced by approximately 20% in magnitude). Those skilled in the art will recognize that appropriate monitoring circuitry and devices may be used to detect such a reduction, allowing the power architecture 200 to shut down in such an event.

Each branch of power architecture 200 includes similar components sized to generate a desired Vout across secondary winding set 254$o$–$z$ of the transformer. According to the invention, each branch is formed of the same design and is formed on PCB, allowing simple and quick maintenance. A defective branch may be fixed by simply replacing the branch with another PCB. Further, the output of power architecture 200 is scalable by simply adding or removing individual branches. Maintenance planning is thus simplified by requiring stocking of a single PCB design for various types of loads.

In one embodiment, where the load is a magnetron, two (2) branches are used which can produce a Vout of approximately 50 kV at 110 Amperes. In another embodiment, where the load is a klystron, five (5) branches are used which can produce a Vout of approximately 160 kV at 120 Amperes with pulse width of approximately 4–7.5 $\mu$sec at a frequency of 100 to 400 Hz. According to one embodiment of the invention, for both loads (the magnetron and klystron), the same branches may be used; the klystron simply utilizes more branches than the magnetron. The result is an improved power architecture which is modular, reliable, and highly accurate.

Figure 6:
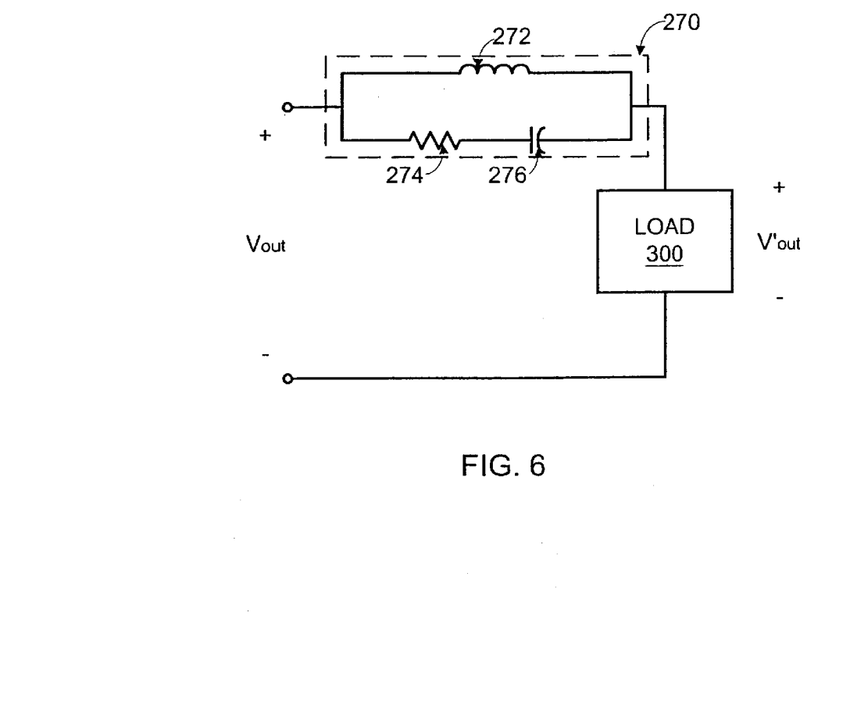
FIG. 6 is a schematic diagram of a droop compensation circuit according to an embodiment of the present invention.

According to one embodiment of the invention, the output pulse generated at Vout is improved by passing the output pulse through a droop compensation circuit such as the circuit depicted in FIG. 6. As shown in FIG. 6, droop compensation circuit 270 is coupled to receive the output pulses from the secondary windings around the transformer(s) (which pulse is designated as Vout) and delivers a pulse of improved quality to load 300 (the improve pulse is designated as V'out). In one embodiment, where the droop compensation circuit 270 utilizes passive components, an inductor 272 having an inductance of approximately 90 $\mu$H is coupled in parallel to a series connected resistor 274 and capacitor 276. Resistor 274, in one embodiment, has a resistance of 25 Ohms while capacitor 276 has a capacitance of 30 nF. The values of these components are selected to trim voltage off a leading edge of a pulse and redistribute it along the remainder of the pulse, resulting in a flattened pulse top. Those skilled in the art will recognize that the sizes of components used will vary on the frequency and magnitude of pulses to be generated by the system.

Figure 7A:
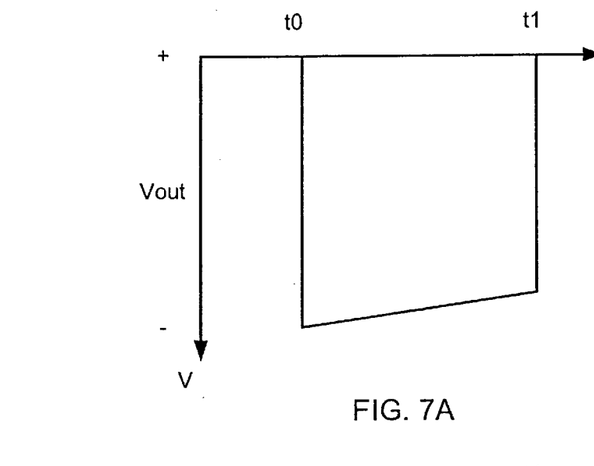
FIG. 7A is a diagram depicting an output pulse without droop compensation.
Figure 7B:
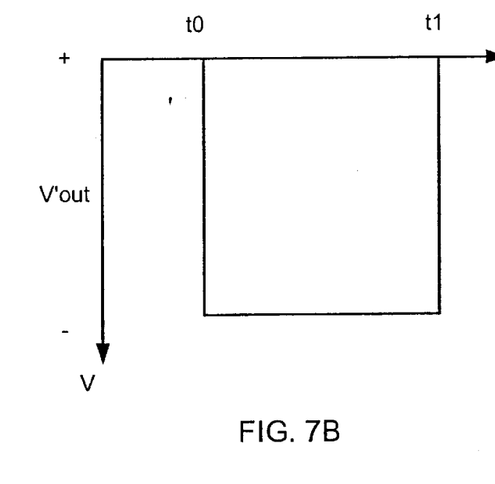
FIG. 7B is a diagram depicting an output pulse from the droop compensation circuit of FIG. 6.

Referring now to FIG. 7A, a pulse diagram is shown which depicts a waveform of Vout without droop compensation. As depicted, the leading edge of the pulse at $t_0$ is slightly greater than the trailing edge at $t_1$. By passing the pulse through droop compensation circuit 270, the overall quality of the pulse is improved. As shown in FIG. 7B, the improved output pulse (shown as V'out) has a substantially flat pulse top from the leading to the trailing edge. By providing a single droop compensation circuit at the output of the secondary of the fractional-turn transformer, Applicants have discovered that the overall quality of the output pulse is improved without excess cost and complexity. Droop compensation circuit 270, in combination with other elements of the invention, also provides other operational advantages. For example, use of droop compensation circuit 270 allows the use of fewer and smaller energy storage capacitors (capacitor 522 of FIG. 5), saving space and cost. Fewer and smaller energy storage capacitors also ensures that less damage is suffered in the event of a short circuit condition. Droop compensation circuit 270 assists in the event of a short circuit by limiting the magnitude and rate of current rise, allowing other circuits to detect that a short circuit condition has occurred. Droop compensation circuit 270 ensures that a clean, well-formed pulse is output despite the use of fewer and smaller storage capacitors. Those skilled in the art will recognize, upon reading this disclosure, that other types of droop compensation circuits may be used with embodiments of the present invention. Preferably, as with the above-described embodiment, any such circuits are provided at the output of the secondary of the fractional-turn transformer.

Although the present invention has been described with respect to a preferred embodiment thereof, those skilled in the art will note that various substitutions may be made to those embodiments described herein without departing from the spirit and scope of the present invention.

What is claimed is:

1. A unified power architecture for generating high frequency switched power to a load, comprising:
a number of input branches, each input branch receiving direct current power from a power source, each input branch comprising
a switch device coupled to a storage device for generating input pulses;
a transformer including a primary winding set receiving said input pulses; and
a reset section generating a reset current for setting a core of said transformer; and
an output section including a plurality of windings around a secondary of each transformer of each of said input branches, said output section generating an output pulse formed from each of said input pulses.

2. The unified power architecture of claim 1, wherein said number of input branches is two.

3. The unified power architecture of claim 1, wherein said number of input branches is selected based on a load to be driven by said output pulse.

4. The unified power architecture of claim 3, wherein said load is selected from one of a magnetron, a klystron, and an electron gun.

5. The unified power architecture of claim 1, wherein said switch device, said storage device, and said reset section are formed on a single printed circuit board (PCB).

6. The unified power architecture of claim 5, wherein each of said PCBs are interchangeable.

7. The unified power architecture of claim 1, wherein each of said number of input branches is formed on a single printed circuit board (PCB).

8. The unified power architecture of claim 7, wherein each of said number of input branches is interchangeable.

9. The unified power architecture of claim 1, further comprising a control circuit, coupled to each of said number of input branches to:
selectively control said switch devices to generate a desired frequency of said input pulses; and
selectively control said reset sections to magnetically reset a core of said transformer in said input branch.

10. The unified power architecture of claim 9, wherein each of said reset sections include an Insulated Gate Bipolar Transistor (IGBT) whose gate is coupled to said control circuit.

11. The unified power architecture of claim 9, wherein each of said switch devices include an IGBT whose gate is coupled to said control circuit.

12. The unified power architecture of claim 11, wherein said IGBT is further coupled to a snubber circuit to discharge excess current when said IGBT is switched between a conducting and non-conducting condition.

13. The unified power architecture of claim 1, wherein said number of input branches is two and said unified power architecture generates peak power output of eight mega Watts.

14. The unified power architecture of claim 1, wherein said number of input branches is five and said unified power architecture generates peak power output of twenty mega Watts.

15. A unified power architecture for use in a radiation therapy device, comprising:
a control unit;
a power supply, selectively controlled by said control unit to generate DC power;
a plurality of input power sections, each input power section coupled to receive DC power from said power supply and including
a switch device coupled to a capacitor for generating input pulses, said switch device selectively controlled by said control unit;
a transformer including at least one primary winding set receiving said input pulses;
a reset section generating a reset current to reset a magnetic condition of said transformer, said reset section selectively controlled by said control unit; and
an output section including a plurality of windings around a secondary of each transformer of each of said input power sections, said output section generating an output pulse formed from each of said input pulses.

16. The power architecture of claim 15, wherein two input power sections are provided and said output pulse is provided to a magnetron.

17. The power architecture of claim 15, wherein five input power sections are provided and said output pulse is provided to a klystron.

18. The power architecture of claim 15, wherein each of said plurality of input power sections are formed on a separate printed circuit board.

19. The power architecture of claim 15, wherein portions of each of said plurality of input power sections are formed on a separate printed circuit board, said printed circuit boards being interchangeable among input power sections.

20. A power architecture, comprising:
a control unit;
a DC power source, selectively operated by said control unit to generate DC power;
a switch, coupled to receive input power from said DC power source and electronically operated between an on and an off state by said control unit;
a storage device which generates a first pulse when said switch is operated between said on and off states;
a first transformer having a primary winding set and a secondary winding set, said primary winding set receiving said first pulse, said secondary winding set also coupled to a secondary of at least a second transformer and producing a second pulse having a higher voltage than the first pulse; and
a reset circuit electronically operated by said control unit to reset a core of said first transformer.

21. A method for driving a high frequency load, comprising:
generating DC power;
providing said DC power to a number of input branches, each input branch:
generates input pulses by operating a switch device in conjunction with a storage device;
applies said input pulses to a primary winding set of a transformer core; and
resets said transformer core between input pulses; and
generating an output pulse from a secondary winding set of a transformer of each of said input branches, said output pulse formed from each of said input pulses.

* * * * *